United States Patent
Pantaenius et al.

(10) Patent No.: US 11,507,628 B1
(45) Date of Patent: Nov. 22, 2022

(54) PROCESS AUTOMATION PLATFORM USING DOCUMENT DATABASE

(71) Applicant: Onspring Technologies LLC, Overland Park, KS (US)

(72) Inventors: Christian C. Pantaenius, Prairie Village, KS (US); Chad Josef Kreimendahl, Overland Park, KS (US); Matthew D. Pugh, Olathe, KS (US); Bradley D. Gentry, Lee's Summit, MO (US)

(73) Assignee: Onspring Technologies LLC, Overland Park, KS (US)

( * ) Notice: Subject to any disclaimer, the term of this patent is extended or adjusted under 35 U.S.C. 154(b) by 0 days.

(21) Appl. No.: 17/319,568

(22) Filed: May 13, 2021

(51) Int. Cl.
  *G06F 16/93* (2019.01)
  *G06F 16/2455* (2019.01)
(52) U.S. Cl.
  CPC ........ *G06F 16/93* (2019.01); *G06F 16/24552* (2019.01)
(58) Field of Classification Search
  CPC ............................ G06F 16/93; G06F 16/24552
  USPC .......................................................... 707/694
  See application file for complete search history.

(56) References Cited

U.S. PATENT DOCUMENTS

| | | | |
|---|---|---|---|
| 10,586,011 B1 * | 3/2020 | Nagle ................... | G06F 30/327 |
| 2005/0039119 A1 * | 2/2005 | Parks .................... | G06F 40/103 |
| | | | 715/209 |
| 2020/0026532 A1 * | 1/2020 | Bill ...................... | G06F 3/04842 |

* cited by examiner

*Primary Examiner* — Kuen S Lu
(74) *Attorney, Agent, or Firm* — Erise IP, P.A.

(57) ABSTRACT

Medium, method, and system for creating process automation applications. By storing applications as documents in a document database, a highly performant platform for process governance, risk management and compliance tracking is achieved. In particular, the disclosed architecture allows for rapid development of low-latency applications without requiring the application developer to write code to implement the application logic. Users can easily view a dashboard showing available applications and access them. At the same time, application developers can quickly develop new applications building on existing (previously developed or bundled) applications.

20 Claims, 4 Drawing Sheets

PROCESS AUTOMATION PLATFORM USING DOCUMENT DATABASE

BACKGROUND

1. Field

Embodiments of the invention generally relate to application development for process management and, more particularly, to improving the performance of a process automation platform by using a document database.

2. Related Art

Traditionally, application development platforms for process management rely on conventional Relational Database Management System (RDBMS) architecture, typically using a Model-View-Controller software design. However, particularly when used for process automation tasks such as customer relations management (CRM), software ticket tracking, release management and other tasks in the governance/risk/compliance (GRC) space, the resulting number of database calls results in poor system performance. Simultaneously, the schema-driven nature of relational databases means that updating an application can require completely restructuring the underlying database. As such, what is needed is a highly performant process management platform which allows for rapid and agile application development.

SUMMARY

Embodiments of the invention address the above-described need by providing for process automation platform using a document database. By using a document database, applications can be edited without the need to restructure a database schema. Simultaneously, by storing more collections of fewer records, the performance of the resulting applications can be improved to the point of reducing application response time below the critical threshold of 200 ms previously shown to result in user dissatisfaction. In particular, in a first embodiment, the invention includes one or more non-transitory computer-readable media storing computer-executable instructions that, when executed by a processor perform a method of creating a process automation application, the method comprising the steps of presenting, to an administrator, a canvas for the process automation application, receiving, from the administrator, an instruction to create a tab on the canvas, receiving, from the administrator, a first indication of a first input field to be added to the tab, receiving, from the administrator, a second indication of a second input field to be added to the tab, receiving, from the administrator, a rule indicating how the second input field should be altered based on input from a user into the first input field, creating, based on the tab, the first input field, and the second input field, a database document representing the process automation application; and storing the database document in a document database.

In a second embodiment, the invention includes method for creating a process automation application, comprising the steps of presenting, to an administrator, a canvas for the process automation application, receiving, from the administrator, an instruction to create a tab on the canvas, receiving, from the administrator, a first indication of a first input field to be added to the tab, receiving, from the administrator, a second indication of a second input field to be added to the tab, creating, based on the tab, the first input field, and the second input field, a database document representing the process automation application; and storing the database document in a document database.

In a third embodiment, the invention includes system for creating a process automation application, comprising: a document database and a process automation server, comprising a processor and at least one non-transitory computer-readable medium storing computer-executable instructions that, when executed by the processor, perform a method for process automation, the method comprising the steps of presenting, to an administrator, a canvas for the process automation application, receiving, from the administrator, an instruction to create a tab on the canvas, receiving, from the administrator, a first indication of a first input field to be added to the tab, receiving, from the administrator, a second indication of a second input field to be added to the tab, receiving, from the administrator, a rule indicating how the second input field should be altered based on input from a user into the first input field, creating, based on the tab, the first input field, and the second input field, a database document representing the process automation application, and storing the database document in the document database.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
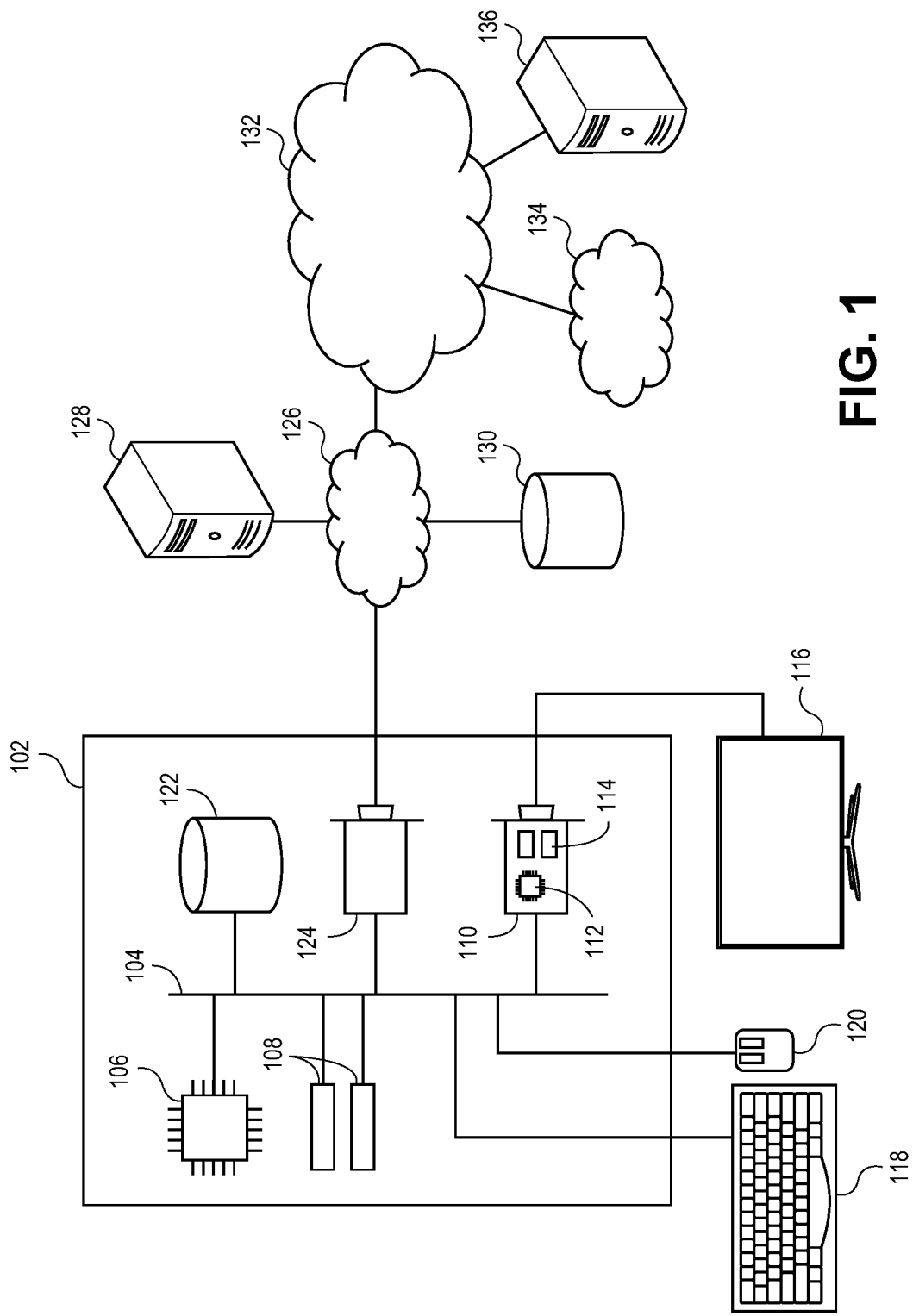
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention provide for a highly performant platform for a variety of tasks including process governance, risk management and compliance tracking using a document database. In particular, the disclosed architecture allows for rapid development of low-latency applications without requiring the application developer to write code to implement the application logic. Users can easily view a dashboard showing available applications and access them. At the same time, application developers can quickly develop new applications building on existing (previously developed or bundled) applications.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
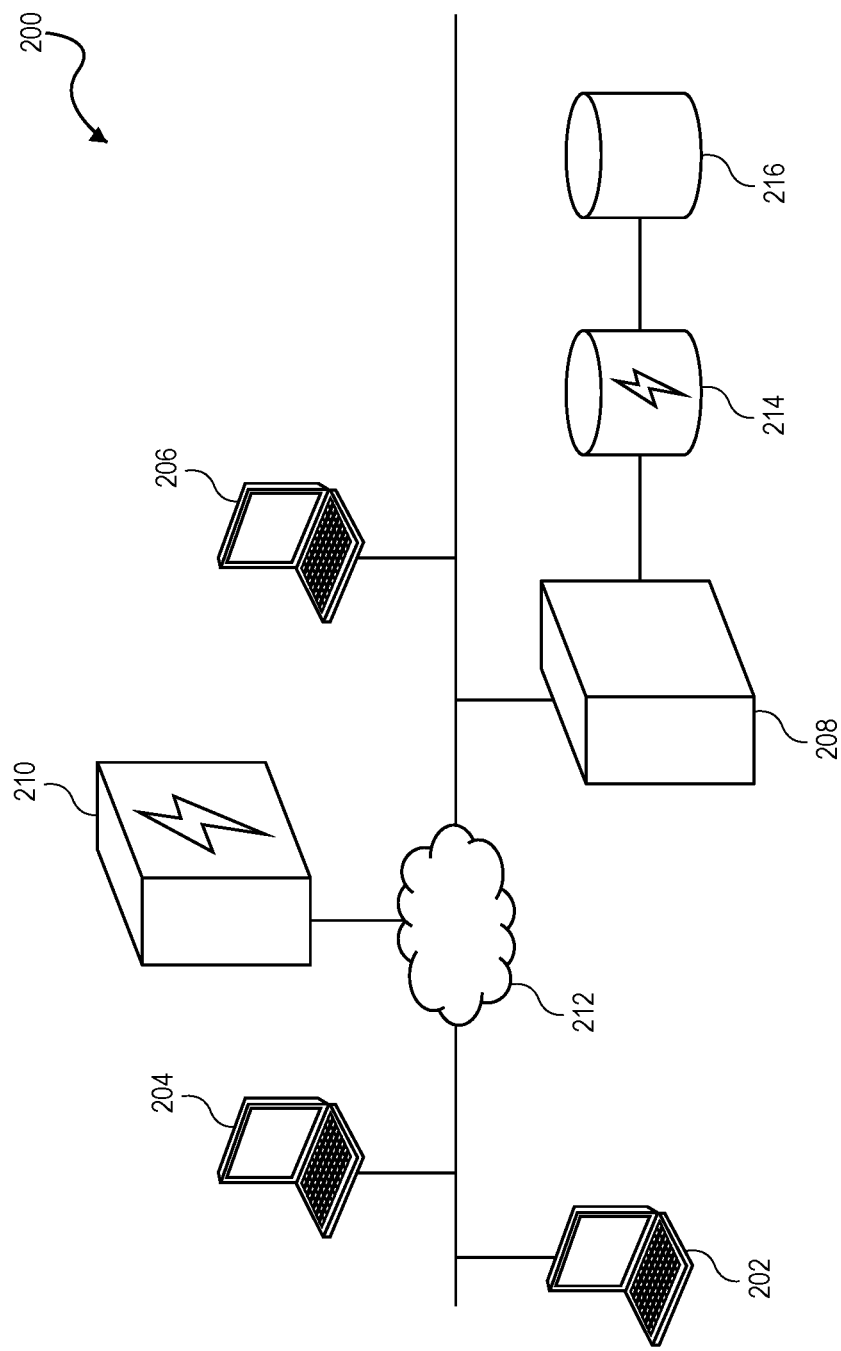
FIG. 2 depicts a system diagram showing the components of a system for carrying out embodiments of the invention.

Turning now to FIG. 2, a system diagram showing the components of a system for carrying out embodiments of the invention is depicted and referred to generally by reference numeral 200. Broadly speaking, system 200 provides an efficient and performant system for workflow management. For example, as non-limiting examples, system 200 may provide for process governance, process automation, risk management and/or compliance management. As depicted in system 200, user device 202 is used by a user to access workflow management system 200. Broadly speaking, user device 202 may be any form of computing device described above with respect to FIG. 1. For example, user device 202 may be a desktop computer, laptop computer, tablet computer, or smartphone. User device 202 may be used by a user of the workflow management system to enter data into workflows for managing business processes and view automatically generated reports based on data entered by user of the system.

Also depicted is non-user device 204, which may likewise be any form of computing device described above with respect to FIG. 1. By contrast with user device 202, non-user device 204 is used by a non-user of the workflow-management system. For example, such a non-user may be a customer of the business controlling system 200 who uses non-user device 204 to take surveys, place orders from the company using system 200, or otherwise interact with system 200 without being a registered user thereof.

Another form of user device is administrator device 206. Like user device 202, administrator device 206 is used by a registered user of system 200. By contrast with user device 202, the function of administrator device 206 is to create and edit workflows and other documents in system 200. Although user device 202 and administrator device 206 are described as distinct devices, a person skilled in the art, reviewing this disclosure, will appreciate that administrator device 206 may also be used to interact with workflows and forms similarly to user device 202. Similarly, a user who uses user device 202 to enter data into one workflow may also use user device 202 to administrate another workflow.

Process automation server 208 provides a front-end and central point of interaction for system 200. For example, system 200 may present a web interface whereby a user may use devices such as user device 202 to interact with other elements of system 200 via the web browser of user device 202. Alternatively or in addition, process automation server 208 may provide a direct client/server interface whereby a user may use devices such as user device 202 to interact with system 200 via dedicated software. For example, if user device 202 is a smartphone, the dedicated software may be in the form of a smartphone app. As yet another alternative, the user may use dedicated software in user device 202 to interact with the other components of system 200, where the dedicated software interacts with process automation server 208 via the web interface.

Particularly in embodiments of the invention where user devices connect to process automation servers via a web interface, performance may be improvised by using a content delivery network edge cache server such as edge cache 210. For example, many reports may use a common HTML template page for presenting the results, with the specific reports populated via JavaScript, AJAX, or another dynamic content population technique. For such pages, performance may be improved by caching the template page in a content delivery network. Alternatively, a separate HTML page may be utilized for each report, which may be cached in the content delivery network edge cache server in the same way. The comparatively small amount of data required to generate the display can then be requested from process automation server 208 directly or using edge cache 210 as a look-through cache. For many applications, by using this technique, the report data can be sent in a single data packet (such as, for example, in an HTTP response that will fit in a single TCP/IP packet), thereby reducing latency and improving performance.

The elements of system 200 may be interconnected via network 212. For example, network 212 may be Internet 132. Alternatively, some or all of the elements of system 200 may be interconnected via a local area network (LAN), wide area network, or virtual private network (VPN), which may in turn interconnect to other elements of the system via Internet 132. In still other embodiments, edge cache 210 may be selected to be located in geographic or network-topology proximity to the user device (such as user device 202, non-user device 204, or administrator device 206). In some such embodiments, different edge caches such as edge cache 210 may communicate with different user devices, non-user devices and administrator devices.

As depicted, process automation server 208 is directly connected to document data cache 214 and document database 216. However, in various embodiments, document data cache 214 and/or document data store 216 may be connected via network 212. For example, document data store 216 may be network-attached storage (NAS) or cloud storage. Broadly speaking, and as described in greater detail below, document data store 216 stores all data associated with workflow management system 200. For example, data store 216 stores representations of workflows, forms, and report templates as well as the data entered into forms, workflow process and response data, survey responses, and data used to generate results. Document data cache 214 serves to store recently accessed documents from document data store 216, and may also store hashed record of documents for invalidation when documents are changed.

Figure 3:
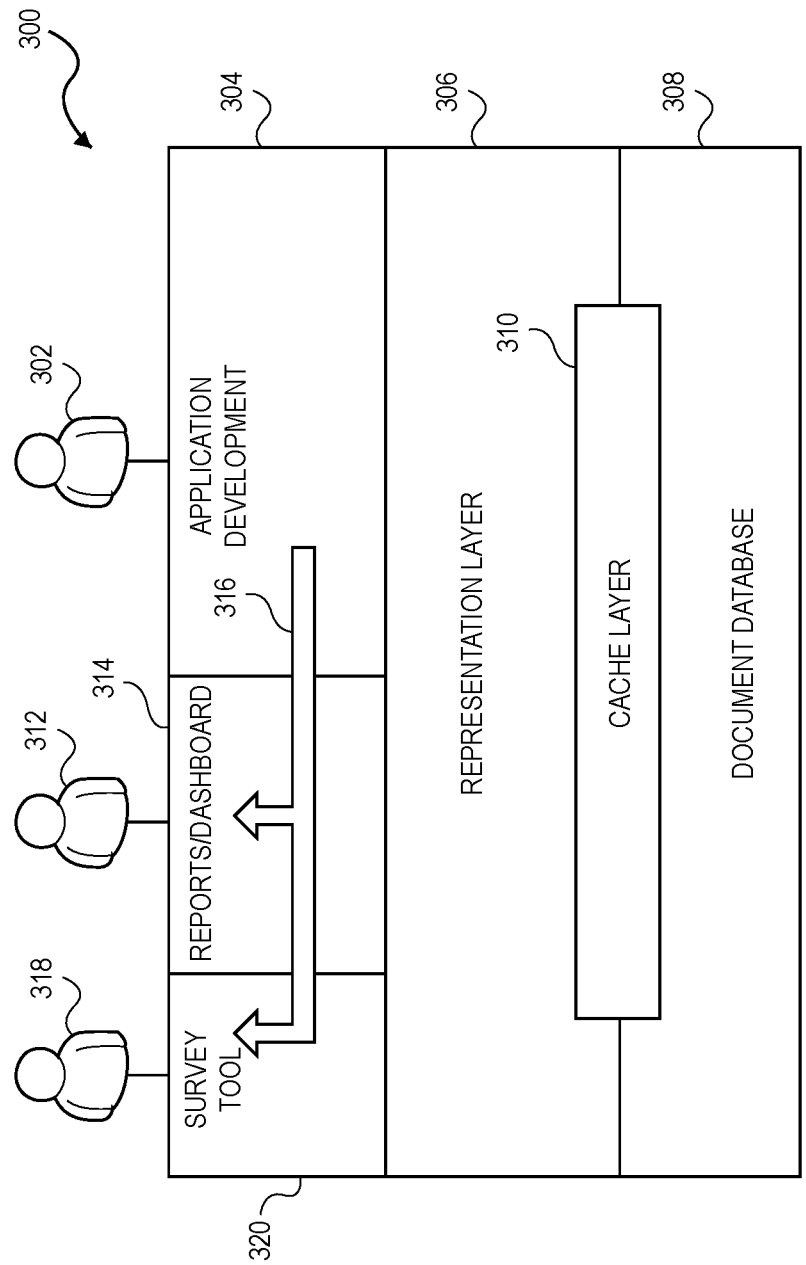
FIG. 3 depicts a system layer diagram schematically illustrating the architecture of a system for process automation in accordance with embodiments of the invention.

Turning now to FIG. 3, a system layer diagram schematically illustrating the architecture of a system for process automation in accordance with embodiments of the invention is depicted and referred to generally be reference numeral 300. For the sake of clarity in description, the discussion of the layers will be provided in order from form creation to data population and report generation; however, a person skilled in the art will appreciate that data may flow between layers in a different order as users interact with the system.

The data flow begins, in this example, with administrator 302 creating an application using application development layer 304. Administrator 302 may be using an administrator device 206 as depicted in FIG. 2. As used in this disclosure, an "administrator" is any user who creates new applications, reports and/or dashboards for use by one or more users of system 200. In this description, the terms "application," "form," and "workflow" are used interchangeably to refer to a user interface allowing users (such as user 312) to enter process data and generate corresponding reports. These reports may be in the form of graphs (or other graphics), spreadsheets, or formatted and/or unformatted textual content. Every business requires different reports and has different processes and different compliance needs; as such, every business will need its own set of workflows, and these needs will not generally be knowable in advance.

Application development layer 304 allows administrator 302 to quickly and easily create new workflows (and the graphical user interfaces for them) by dragging and dropping existing fields and objects in the system. These fields and objects may be entered data (for example, an employee name), calculated data based on other data, automatically generated objects (such as graphs), links to external objects, or other report input or output elements. As such, the administrator can develop new applications without the need to write any code. Administrator 302 can also specify the layout of the fields, objects, and reports on the user interface, as well as designate fields as required or optional. In some embodiments, basic or commonly used reports can be provided by default without administrator 302 being required to create them. Similarly, certain commonly used fields may be provided by default to assist administrator 302 in easily creating custom applications.

Once administrator 302 has designed the application, it can be stored in document database 308. Representation layer 306 intermediates between application development layer 304 and document database 308 and allows for increased performance by visual data representation, storing forms essentially as they appear to the user (such as user 312 or administrator 302). Conventional user interfaces for entering, processing, and displaying data rely on database query languages such as the Structured Query Language (SQL) and require that each field correspond to a (stored or computed) record and be of a single fixed data type. Changing the type of a record thus requires re-implementing any forms that rely on that record. Furthermore, such techniques typically require multiple database queries per report and potentially one query or more per field in that report. As such, performance is significantly decreased. By contrast, representation layer 306, as used in embodiments of the present invention, represents each application as a single dynamic record which corresponds to a single document in document database 308. This in turn allows for rapid application development and dynamic data typing. Furthermore, since each application is represented as a database object, versioning can be used to easily track (and, if needed, roll back) changes to applications as they are developed by administrator 302.

Document database 308, by contrast with a conventional relational database used in a data management platform, stores more collections of fewer records. For example, in some embodiments of the invention, each application is stored in a separate collection. This stands in contrast to a conventional relational database system where data fields usable in applications are stored in tables and the application logic is stored separately as code or as stored queries. This further allows objects to be stored directly into the database without transformation, as would be otherwise required.

Between representation layer 306 and document database 308 is caching layer 310. Caching layer 310 stores recently accessed objects from document database 308 such that they can be re-accessed more quickly than if they were to be accessed from database 308. In some embodiments of the database, hashes of records are also stored in caching layer 310. In such embodiments, when records are updated in the database (by, for example, administrator 302 updating an application or by user 312 changing a data record) the hash of the object can be used to determine that the unmodified version of the data record is in the cache and invalidate the corresponding cache entry. In this way, cache staleness can be avoided.

Next, user 312 may access any of the applications or reports created by administrator 302 (or included with the system) using reports and dashboard interface 314. In particular, user 312 may input data into the fields in the report created by administrator 302 in order to (for example) verify compliance or update the progress of a particular process. Data entered by user 312 may be stored in document database 308 in the same collection with the associated application. Alternatively, data for a particular application may be stored in a collection dedicated to that application but distinct from the collection storing the application itself.

In addition to entering data for a given application, user 314 may also interact with a particular application by viewing reports generated based on previously entered data. By viewing these reports, user 312 can monitor compliance or track the progress of the associated process. Although only a single user is depicted in FIG. 3, in some embodiments, any number of users can enter data into a particular application (or into a variety of applications) and any number of users can view reports based on the inputted data.

Furthermore, during application development, administrator 302 may optionally supply one or more rules to dynamically update the fields as user 312 inputs data into the application. These rules can then be implemented by rules engine 316. Rules engine 316 may add, remove, alter, make mandatory, or disable fields based on the data entered into other fields. In some embodiments, administrator 302 can define rules using a programming language such as JavaScript.

For example, when an administrator creates an application for tracking the completion of each iteration of a recurring project, they may specify a number of phases for the project that should be completed in order. Each phase may have an owner who is responsible for completing that phase, a completion date, and a verifier who is responsible for confirming that the phase has been completed satisfactorily. When creating the application, the administrator may define a first rule that, when a new iteration of the recurring project begins, only the first phase of the project is visible. The administrator may define a second rule specifying that the verification checkbox is disabled for input until the owner indicates that the first phase is complete by providing a completion date, whereon the verification checkbox becomes enabled for the designated verifier. Once the designated verifier checks the checkbox, the first phase is complete and (per the first rule), the next phase can be made visible for the owner of that phase.

A person of skill in the art, reviewing this specification, will appreciate that a wide variety of form logic can be implemented using rules engine 316. For example, mailing address formats for different countries can be accommodated by providing fields appropriate to each country and activating (and/or making visible) only the appropriate set of fields based on a selected country. Similarly, data formatting can be verified, additional information can be requested conditionally, data can be imported automatically based on user input, and records can be edited in bulk using rules engine 316. Rules engine 316 may additionally be operable to automatically import data to populate fields based on user- or administrator-specified data sources. For example, rather than entering a large set of data records field-by-field, a user could specify a location from which a file of data records is automatically imported.

In addition to user 312 inputting data, in some embodiments, non-users such as non-user 318 may also be able to enter data (for example, using non-user device 204) into applications using survey tool 320 if specified by the administrator 302. This may be the case, for example, where the application involves information from customers, vendors, or other non-members of the organization that operates system 200. Such non-users should be able to provide information where specified by administrator 302, but not generally have the same level of access to the internal data of system 200 as user 312 or administrator 302. For example, a user completing a report using reports and dashboard interface 314 may have access to previous reports and data entered into the particular report being completed by other users like 312. By contrast, non-users 318 should be able to enter their own data, but not view data entered by other non-users like non-user 318 or the resulting reports aggregating data entered by multiple non-users. In this way, survey tool 320 provides limited and narrowly tailored access to systems otherwise protected by the firewall protecting the organization's data to allow interaction by non-users without compromising the data protection. In some embodiments of the invention, users such a user 312 must authenticate to the system prior to accessing it, while non-users 318 can access the system without authentication (such as, for example, by visiting a provided link in their web browser).

Figure 4:
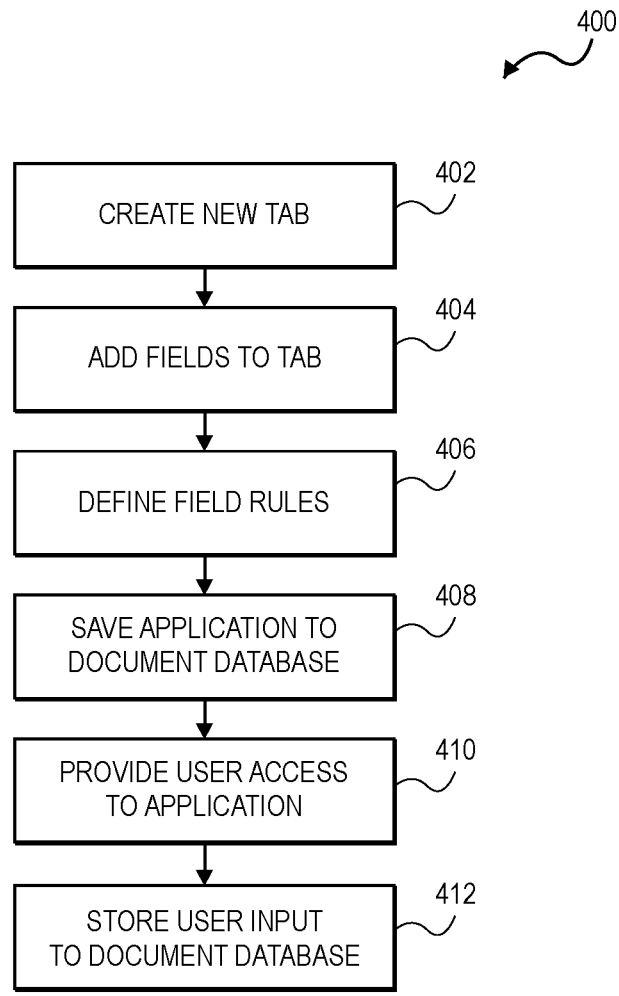
FIG. 4 depicts a flowchart illustrating the operation of a method in accordance with embodiments of the invention.

Turning now to FIG. 4, a flowchart illustrating the operation of a method in accordance with embodiments of the invention is depicted and referred to generally by reference numeral 400. Initially, at step 402, an administrator (such as administrator 302) begins the process of creating a new application by creating at least one tab in the application. For example, a new application may be represented by a blank canvas, and the user can add tabs using a "New Tab" button. Broadly speaking, a tab is a collection of one or more input and/or output fields, as described in additional detail below. For example, tabs may be used to organize fields conceptually, by a responsible user, by type, or by any other criterion. For example, a first tab might provide for entry of a collection of fields describing users, a second tab might provide a collection of fields representing tasks, and a third tab might show outputs relating to current tasks organized by responsible user and task status. In some embodiments, tabs may be assigned a title, dimensions, and position on the canvas for the applications. In some embodiments, tabs can be rearranged and resized by using drag-and-drop on a representation of the canvas. As described below with respect to step 404, the administrator may populate tabs with chosen fields. The administrator may also add additional tabs to the application at any point, either before, after, or during the process of adding fields to other tabs.

Next, at step 404, the administrator adds one or more fields to the newly created tab. Broadly, fields represent controls for the entry of data and/or the display of previously entered data or analysis thereof. In some embodiments of the invention, the administrator can select fields to add using a drop-down menu listing available fields. Where additional data is needed to fully specify a field (such as an input method for an input field or a data series for an output chart), an additional dropdown or prompt may appear responsive to the administrator selecting the initial field. In this way, fields can be specified by the administrator in a very small number of clicks.

Input fields may allow users to input data directly or to indicate a source for the importation of data. Considering, as an example, a data record representing a person (such as a customer, an employee, a contractor, or any other person), the administrator may provide fields for a user to later enter data relating to that person in a variety of ways. In some embodiments, the administrator may provide the user the option to enter data for the person in whichever of these ways is most convenient.

For example, if the person is already in the system, the user might choose an "existing person" import. If the user is entering data for a person not previously in the system, they may be able to manually type in data for each record (such as, for example, name, address, and account information). If the user is entering data for many people at the same time, the administrator may provide for bulk entry (such as providing many fields that can be entered in parallel rather than one at a time) or bulk import options (such as file import). If the data is being imported from an external source, the administrator may provide a field for the user to input a data source (such as a Uniform Resource Locator (URL), RDF Site Summary (RSS) feed, external database information, or any other data source) from which the data can be imported or later updated.

When specifying an input data field, the administrator may provide a variety of different input methods depending on the type of data being input. Different types of data may be entered using different methods. For example, when entering a person's name, a free-text field may be provided for entering new users, while a drop-down menu or autocomplete field may be provided where the administrator expects the person to already be in the system. Similarly, when entering an address, a free-text field with autocomplete may be provided, a map interface may be provided, or a GPS auto-locate method may be provided. In some embodiments, output fields (or particular output fields as specified by the administrator) may be live output fields. Live output fields can be updated substantially in real time if the corresponding data record changes while a report including that field is being viewed by a user, without requiring the user to manually refresh the report.

Similarly, the administrator may provide one or more output fields to the newly created tab. In some embodiments, output fields may simply be the converse of input fields, allowing previously entered data to be displayed. Other embodiments may additionally provide for analysis of previously entered data. For example, an administrator may provide for a data record representing a particular task of a project, with associated fields representing task status, prerequisite tasks and dependent tasks, estimated time required to complete the task, and a user responsible for completing the task. In some embodiments, the output field corresponding to "task status" could reflect whether a user has marked the task as complete or not. In other embodiments, the output field could be displayed as "complete" (if the user has marked the task as complete), "blocked" (if one or more prerequisite tasks are incomplete), or "pending" (if the task is not blocked but not marked as complete).

Similarly, output fields can represent calculated values or visual data representations of input data. For example, calculated fields can represent a count of data records matching a particular criterion (for example a number of customers purchasing a particular product), an arithmetic function (for example, average cost per product), or any other value calculated from one or more data records stored in the document database or imported from an external source. Visual data representations can include graphs, charts, or conditional formatting based on data values. Continuing the example of tasks given above, an administrator might specify a Gantt chart as an output field. When a user subsequently runs the report, the system can automatically generate an up-to-date Gantt chart based on task status and dependencies. The administrator could also specify an additional output field listing uncompleted tasks, colored green if they are on schedule, yellow if they are blocked, and red (together with the responsible user) if they are behind schedule.

Broadly speaking, any type of chart or graph is contemplated as being an output field in the invention, including bar graphs, pie charts, candlestick plots, histograms, and time series of data. In some embodiments of the invention, statistical analysis of data records (for example, linear or non-linear regressions) are also available as output functions. In some embodiments, three- or four-dimensional data plots are available. In some embodiments, three-dimensional representations of one- or two-dimensional plots are also available as output fields. In some embodiments, plots or output fields may include data keys, or the administrator may specify a data key as a separate output field.

Next, at step 406, the administrator can specify one or more rules for dynamically updating one or more fields as new information is entered. For example, fields can be hidden, revealed, prepopulated, altered, or otherwise updated based on data entered (or partially entered) in the field being updated or into other fields. In some embodiments, the administrator can specify rules using code such as JavaScript or Python. In other embodiments, a graphical user interface is provided to specify rules. In some embodiments, live fields (described above) can be implemented or updated using the rules engine. In some embodiments, rules further allow for automatic data importation responsive to user input.

Once the administrator has added the desired tabs and the desired fields to each tab, the application can be saved into the document database at step 408. As described above, the application is stored visually in the document data store, substantially as it is displayed to the user. This allows for greatly increased performance over prior solutions. In some embodiments, applications are editable after they have been stored and stored in versioned form so that changes can be easily rolled back and changes to applications can be tracked and merged between applications. In some embodiments, saving an application (and thereby storing it into the document database) automatically causes cache layer 310 to invalidate previous versions of the application so that subsequent requests for that application by users request the updated version.

Later, at step 410, the application is accessed by a user such as user 312. When the user attempts to access the application, the corresponding record from the application collection is retrieved from the document database. In some embodiments, the document database may be accessed via the cache layer, which may be a look-aside cache or a look-through cache. In some embodiments the cache layer stores only (or primarily) application records as being less likely to change and/or more frequently accessed than data records. For certain applications, all fields may be output fields such that the user views the application as a (potentially dynamically updating) report. In other embodiments, the user inputs data into (or changes data already in) the application. As described above with respect to step 404, a variety of input methods are contemplated for use with embodiments of the invention, and users may use any input method (or those input methods specified by administrator 302 during application development) to enter the appropriate data into the application.

For those applications or views where users update or input data, processing then proceeds to step 412, where the data input by the user is stored into the document data store. As described above, for certain applications, all data for the application may be stored in a single collection with the record for the application. This may be the case where, for example, the application represents a single, statically sized data set. In such embodiments, each time a user updates or adds to the data in an application, a new instance of the corresponding data record may be created. In other embodiments, data for the application may be stored in one or more collections either specific to the application or shared between a set of related applications. This is particularly useful where, for example, the application represents a set of data records corresponding to individual entities (such as one record per customer). In some such embodiments, users may be able to edit records in bulk with a single click. For example, a user who sends out a mass mailing may update the "Last Contacted" field for all affected customers with a single click without having to manually edit each record.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by a processor perform a method of creating a process automation application, the method comprising:
   receiving, from an administrator, a first instruction to create a new canvas for the process automation application,
   creating the new canvas for the process automation application, the new canvas being initially blank;
   presenting, to the administrator, the new canvas for the process automation application,
   receiving, from the administrator, a second instruction to create a new tab on the new canvas,
   creating the new tab on the new canvas, the new tab being initially blank;
   receiving, from the administrator, a first indication of a first input field to be added to the new tab;
   receiving, from the administrator, a second indication of a second input field to be added to the new tab;
   receiving, from the administrator, a rule indicating how the second input field should be altered based on input from a user into the first input field;
   creating, based on the new tab, the first input field, and the second input field, a database document representing the process automation application; and
   storing the database document as a single dynamic database record in a document database,
   wherein the document database is a schema-free database.

2. The media of claim 1, wherein the new canvas includes one or more existing pre-generated tabs and the process automation application is a pre-generated process automation application being customized by the administrator.

3. The media of claim 1, wherein the method further comprises:
   receiving, from a user device, a request for the process automation application;
   retrieving, from the document database, the database document corresponding to the process automation application;
   generating, based on the database document, an HTML document corresponding to the process automation application; and
   transmitting the HTML document to the user device.

4. The media of claim 3, wherein the method further comprises:
   receiving, from the user device, a user data submission including report input data;
   generating a report input database document including the report input data; and
   storing the report input database document in the document database as a database object.

5. The media of claim 4, wherein generating the report input database document comprises modifying the database document to include the report input data.

6. The media of claim 3, wherein the HTML document is generated to be of a size such that the HTML document is transmitted to the user device in a single TCP/IP packet.

7. The media of claim 1, wherein the first instruction, the second instruction, the first indication, the second indication, and the rule are received via a smartphone application.

8. A method for creating a process automation application, comprising the steps of:
- receiving, from an administrator, a first instruction to create a new canvas for the process automation application,
- creating the new canvas for the process automation application, the new canvas being initially blank;
- presenting, to the administrator, the new canvas for the process automation application;
- receiving, from the administrator, a second instruction to create a new tab on the new canvas;
- creating the new tab on the new canvas, the new tab being initially blank;
- receiving, from the administrator, a first indication of a first input field to be added to the new tab;
- receiving, from the administrator, a second indication of a second input field to be added to the new tab;
- creating, based on the new tab, the first input field, and the second input field, a database document representing the process automation application; and
- storing the database document as a single dynamic database record in a document database,
- wherein the document database is a schema-free database.

9. The method of claim 8, wherein the process automation application is a survey application.

10. The method of claim 9, further comprising the steps of:
- receiving, from a non-user device, a request for the survey application;
- retrieving, from the document database, the database document corresponding to the survey application;
- generating, based on the database document, an HTML document corresponding to the survey application; and
- transmitting the HTML document to the non-user device.

11. The method of claim 10, further comprising:
- receiving, from the non-user device, a non-user data submission including survey data;
- generating a survey database document including the survey data; and
- storing the survey database document in the document database.

12. The method of claim 8, wherein:
- the new canvas is presented to the administrator via a web interface; and
- the first instruction, the second instruction, the first indication, and the second indication are received via the web interface.

13. The method of claim 8, wherein the process automation application is programmed to generate at least one report in response to user queries.

14. A system for creating a process automation application, comprising:
- a schema-free document database; and
- a process automation server, comprising a processor and at least one non-transitory computer-readable medium storing computer-executable instructions that, when executed by the processor, perform a method for process automation, the method comprising:
  - receiving, from an administrator, a first instruction to create a new canvas for the process automation application;
  - creating the new canvas for the process automation application, the new canvas being initially blank;
  - presenting, to the administrator, the new canvas for the process automation application;
  - receiving, from the administrator, a second instruction to create a new tab on the new canvas;
  - creating the new tab on the new canvas, the new tab being initially blank;
  - receiving, from the administrator, a first indication of a first input field to be added to the new tab;
  - receiving, from the administrator, a second indication of a second input field to be added to the new tab;
  - receiving, from the administrator, a rule indicating how the second input field should be altered based on input from a user into the first input field;
  - creating, based on the new tab, the first input field, and the second input field, a database document representing the process automation application; and
  - storing the database document as a single dynamic database record in a document database, wherein the document database is a schema-free database.

15. The system of claim 14, further comprising a cache layer, and wherein storing the database document in the document database includes storing the database document in the cache layer.

16. The system of claim 14, wherein the method further comprises:
- receiving, from a user device, a request for the process automation application;
- retrieving, from the document database, the database document corresponding to the process automation application;
- generating, based on the database document, an HTML document corresponding to the process automation application; and
- transmitting the HTML document to the user device.

17. The system of claim 16, wherein retrieving, from the document database, the database document corresponding to the process automation application includes retrieving the database document via a cache layer.

18. The system of claim 16, wherein the HTML document is transmitted to the user device in a single TCP/IP packet.

19. The system of claim 16, wherein the process automation application performs at least one governance/risk/compliance task.

20. The system of claim 14, further comprising a web interface for allowing the user to interact with the system using a web browser of a client device.

* * * * *